Patented Oct. 9, 1928.

1,687,094

UNITED STATES PATENT OFFICE.

SAMUEL ISERMANN, OF EAST ORANGE, NEW JERSEY, AND WALDEMAR VERNET, OF NEW YORK, N. Y.

FREEZING-POINT DEPRESSANT.

No Drawing.  Application filed July 9, 1925.  Serial No. 42,606.

The present invention relates to substances for depressing the freezing point of water or aqueous solutions, particularly the water used for cooling the cylinders of automobile or aeroplane engines.

In producing a suitable freezing point depressant many conditions are presented, all of which must be in a measure satisfied, whereby the problem is rendered a difficult one and by no means as easy as may appear at first sight.

Various inorganic materials have been proposed, but as a rule these have been unsatisfactory due to the fact that upon continued use a substantial amount of corrosion is produced upon the metallic and non-metallic parts composing the circulatory system. In the organic field, ethyl and methyl alcohol, for example, have been and are widely used, but have the serious disadvantage that they are volatile under conditions of use whereby they must be constantly replenished. This presents a real difficulty in that unless the mixture be tested from time to time (which is inconvenient) reliance cannot be placed upon the mixture in the radiator not freezing. A false sense of security may thus easily arise.

In producing the improved depressants of our invention we have endeavored to satisfy the following conditions:

First: The absence of tendency to corrode the various materials commonly used in the different parts of the engine cooling systems, such as iron, brass, aluminum, copper, solder, etc., and in addition absence of tendency to decompose and gum upon continued use.

Second: A boiling point which is comparatively high, and such that in general there will be practically no loss of the material through evaporation, in case for some reason the engine becomes over heated for a considerable period the loss of the cooling solution will be principally with respect to the water rather than the depressant, whereby the freezing point of the material that remains will still be within a safe region of the temperature scale.

Third: The flash point of the depressant should be high enough to permit of its being classified as non-inflammable by the Bureau of Combustibles, thereby avoiding the strict regulations under which inflammable materials are shipped and sold and so greatly reducing the risk and expense of selling.

Fourth: A not too high viscosity of the cooling mixture at temperatures near the freezing point. Otherwise the capacity of the pump may be exceeded and local overheating may result.

After long study and experimentation we have discovered freezing point depressants meeting the above requirements in the soluble amids, the most useful being acetamid $CH_3CONH_2$ and formamid $HCONH_2$. Formamid is a liquid boiling at approximately 192° C., while actamid at room temperatures is a solid and boils at around 220° C. Both of the amids mentioned are soluble in water in all proportions. In use, the proportions of both substances to water, may, of course, be varied depending upon the freezing point desired for the cooling liquid. The following are examples of mixtures which may be employed, the parts in these and the succeeding examples being by weight.

| | |
|---|---|
| Acetamid | 30 parts |
| Water | 70 parts |
| Freezing point of mixture | −12° C |

| | |
|---|---|
| Formamid | 30 parts |
| Water | 70 parts |
| Freezing point of mixture | −15° C |

In the case of formamid a further increase in the proportion thereof to water results in a further depression of the freezing point until equal molecular quantities of formamid to water are reached, whereupon the mixture has a freezing point of −50° C. This proportion corresponds to 71.5 parts by weight of formamid to 28.5 parts by weight of water. Both formamid and acetamid in addition to meeting the above requirements, are characterized by non-inflammability, and great stability.

We have discovered a further substance answering the requirements above set forth in hydroxy −2 keto-4 methyl pentane which has the formula $HOC(CH_3)_2CH_2COCH_3$ and is known commercially as diacetone alcohol. This substance may be regarded as a condensation product of acetone, and is a liquid having a boiling point of from 160° C. to 170° C. Diacetone alcohol may be used alone or in combination with other depressants, such as the amids mentioned. A suitable mixture of diacetone alcohol and water is 40 parts by weight of the former to 60 of the latter substance. When used with formamid, the following proportions will give a mixture having a freezing point of −125° C.:

| | Parts by weight. |
|---|---|
| Diacetone alcohol | 15 |
| Formamid | 15 |
| Water | 70 |

Other alcohols (or acetals) which may be regarded as substantial equivalents of diacetone alcohol are diacetone glycerine, acetyl acetone.

The substances we have described, particularly formamid and diacetone alcohol, have the further advantage that they make possible the use of glycerine and certain other substances of analogous composition such as ethylene glycol, available as freezing point depressants.

Glycerine, for example, is an excellent freezing point depressant except for the fact that at temperatures close to the freezing point the aqueous mixture becomes too viscous to be efficiently handled by the circulating pumps commonly used in automobile work. Glycerine, moreover, is cheap and available in unlimited quantities. We have now discovered that the amids mentioned or diacetone alcohol or a mixture of these materials may be used in combination with glycerine and a mixture produced which will satisfy all the requirements including a satisfactory viscosity in aqueous solution at temperatures near the freezing point. Thus a mixture of 80% by weight glycerine and 20% formamid or of diacetone alcohol (or mixture thereof) will give a satisfactory freezing point depressant for use in any desired quantity. Following are examples of suitable mixtures:

| | |
|---|---|
| Glycerine | 15 parts |
| Formamid | 15 parts |
| Water | 70 parts |
| Freezing point | −14.5° C. |

| | |
|---|---|
| Glycerine | 10 parts |
| Formamid | 10 parts |
| Diacetone alcohol | 10 parts |
| Water | 70 parts |
| Freezing point | −12° C. |

| | |
|---|---|
| Glycerine | 15 parts |
| Diacetone alcohol | 15 parts |
| Water | 70 parts |
| Freezing point | −10.5° C. |

It will be understood that the freezing point depressants which we have described may be used either alone or in combination with other depressants which have not been mentioned.

What we claim is:

1. A composition of matter for depressing the freezing point of water or an aqueous solution said composition comprising a soluble amid and glycerine.

2. A composition of matter for depressing the freezing point of water or an aqueous solution said composition comprising a soluble amid, diacetone alcohol and glycerine.

3. A new composition of matter for depressing the freezing point of water or an aqueous solution said composition containing glycerine and capable of being used in a quantity at least sufficient to depress the freezing point of water 15° C. and having a maximum viscosity in aqueous solution materially less than the nearest equivalent solution of pure glycerine.

4. As a new composition of matter for depressing the freezing point of water or aqueous solution, glycerine and a substance reducing the viscosity of an aqueous solution of glycerine and having freezing point depressing properties sufficient to yield an aqueous mixture having a freezing point of −15° C. and capable of being pumped efficiently at temperatures immediately above the freezing point by the water circulating pumping means obtaining in automobile practice.

In testimony whereof we have affixed our signatures to this specification.

SAMUEL ISERMANN.
WALDEMAR VERNET.